United States Patent
Lee et al.

(10) Patent No.: US 12,125,162 B2
(45) Date of Patent: *Oct. 22, 2024

(54) METHOD AND APPARATUS FOR PROVIDING GUIDE FOR COMBINING PATTERN PIECES OF CLOTHING

(71) Applicant: CLO Virtual Fashion Inc., Seoul (KR)

(72) Inventors: Hohyun Lee, Seoul (KR); Yeji Kim, Seoul (KR)

(73) Assignee: CLO Virtual Fashion Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,932

(22) Filed: May 19, 2023

(65) Prior Publication Data

US 2023/0290100 A1    Sep. 14, 2023

Related U.S. Application Data

(63) Continuation of application No. 17/027,404, filed on Sep. 21, 2020, now Pat. No. 11,694,414.

(30) Foreign Application Priority Data

Aug. 19, 2020 (KR) .......................... 10-2020-0104075

(51) Int. Cl.
    *G06T 19/20* (2011.01)
    *G06F 3/0482* (2013.01)
    *G06T 17/20* (2006.01)

(52) U.S. Cl.
    CPC ............ *G06T 19/20* (2013.01); *G06F 3/0482* (2013.01); *G06T 17/20* (2013.01); *G06T 2200/24* (2013.01); *G06T 2210/16* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 7,623,697 | B1 | 11/2009 | Hughes et al. |
| 7,812,850 | B1 | 10/2010 | Nelson |
| 10,127,480 | B1 | 11/2018 | Lehrer et al. |
| 10,475,099 | B1 | 11/2019 | Nomula et al. |
| 2002/0130890 | A1 | 9/2002 | Karatassos et al. |
| 2004/0049309 | A1 | 3/2004 | Gardner et al. |

(Continued)

FOREIGN PATENT DOCUMENTS

| | | |
|---|---|---|
| JP | H06-49767 A | 2/1994 |
| JP | 2000-003383 A | 1/2000 |
| JP | 4739430 B2 | 8/2011 |

*Primary Examiner* — Andrew G Yang
(74) *Attorney, Agent, or Firm* — WTA Patents

(57) ABSTRACT

A method and apparatus for providing a guide for combining pattern pieces receives a selection of a first point in a first pattern piece and a selection of a second point in a second pattern piece to be combined with the first pattern piece, generates a virtual pattern piece in response to the selection of the second point being received, arranges the virtual pattern piece such that a third point in the virtual pattern piece having a position corresponding to the first point in the first pattern piece is matched to the second point in the second pattern piece, and provides a guide for combining the first pattern piece and the second pattern piece by moving the virtual pattern piece such that an outer line of the second pattern piece and an outer line of the virtual pattern piece correspond to each other.

20 Claims, 6 Drawing Sheets

(56) References Cited

U.S. PATENT DOCUMENTS

| | | |
|---|---|---|
| 2014/0229143 A1 | 8/2014 | Cohen-Or et al. |
| 2015/0134302 A1 | 5/2015 | Chhugani et al. |
| 2015/0178991 A1 | 6/2015 | Letzelter et al. |
| 2016/0314604 A1 | 10/2016 | Oh et al. |
| 2016/0328887 A1 | 11/2016 | Elvezio et al. |
| 2016/0358374 A1 | 12/2016 | Ju et al. |
| 2017/0000203 A1 | 1/2017 | Jung et al. |
| 2017/0242492 A1 | 8/2017 | Horowitz |
| 2019/0066389 A1 | 2/2019 | Jacobson et al. |
| 2019/0087078 A1 | 3/2019 | Norton et al. |
| 2019/0121524 A1 | 4/2019 | Hakansson et al. |
| 2019/0266664 A1 | 8/2019 | Beckham |
| 2019/0361589 A1 | 11/2019 | Yerli |
| 2020/0201945 A1 | 6/2020 | Birkett-Smith et al. |
| 2020/0226307 A1 | 7/2020 | Ichinose |
| 2020/0311974 A1 | 10/2020 | Pareek et al. |
| 2021/0342493 A1 | 11/2021 | Wilcox |

METHOD AND APPARATUS FOR PROVIDING GUIDE FOR COMBINING PATTERN PIECES OF CLOTHING

CROSS-REFERENCE TO RELATED APPLICATIONS

This is a continuation of U.S. patent application Ser. No. 17/027,404, filed on Sep. 21, 2020, which claims priority to Republic of Korea Patent Application No. 10-2019-0101365 filed on Aug. 19, 2019, and Republic of Korea Patent Application No. 10-2020-0104075 filed on Aug. 19, 2020, the entire disclosures of which are incorporated herein by reference for all purposes.

BACKGROUND

1. Field of the Invention

One or more example embodiments relate to a method and apparatus for providing a guide for combining pattern pieces of clothing.

2. Description of the Related Art

Fabric which is a material for clothing is flexible, and thus it may be varied in appearance from moment to moment according to a body shape or motion of a person who wears it. Thus, to simulate clothing made with a flexible material such as fabric in three dimensions to appear more realistic, an approach different from that of modeling an object made with a rigid material may be required.

Virtual clothing may be formed with a plurality of layers of two-dimensional (2D) pattern pieces. Thus, when measuring a distance or length between the pattern pieces, or sewing the pattern pieces, it may not be easy to determine an accurate combination position for combining the pattern pieces. In addition, when a pattern is altered or changed after the length is measured or the combination position is determined, there may be inconvenience of setting again two points or determining again a combination position.

The above description has been possessed or acquired by the inventor(s) in the course of conceiving the present invention and is not necessarily an art publicly known before the present application is filed.

SUMMARY

As aspect provides a method and apparatus that determines a combination position for combining two-dimensional (2D) pattern pieces of clothing by moving the 2D pattern pieces and comparing lengths of portions to be combined.

Another aspect provides a method and apparatus that provides a simulation using a virtual pattern piece representing an outer shape of a 2D pattern piece, and compares lengths of pattern pieces with a relatively lower computational complexity and/or at a relatively higher processing speed, compared to when using pattern pieces including texture, or provides a guide for sewing the pattern pieces.

According to an aspect, there is provided a method of providing a guide for combining pattern pieces, the method including receiving a selection of a first point in a first pattern piece, receiving a selection of a second point in a second pattern piece to be combined with the first pattern piece, generating a virtual pattern piece corresponding to the first pattern piece in response to the selection of the second point being received, arranging the virtual pattern piece such that a third point in the virtual pattern piece is matched to the second point in the second pattern piece, and providing a guide for combining the first pattern piece and the second pattern piece by moving the virtual pattern piece such that an outer line of the second pattern piece and an outer line of the virtual pattern piece correspond to each other. The third point may be at a position corresponding to the first point in the first pattern piece.

The virtual pattern piece may have an outer shape corresponding to the first pattern piece.

The arranging of the virtual pattern piece may include calculating a second normal vector of a tangent line corresponding to the second point, calculating a third normal vector of a tangent line corresponding to the third point, and arranging the virtual pattern piece such that the second point and the third point correspond to each other and the second normal vector and the third normal vector are a straight line.

In response to the third point corresponding to a curve or a corner point, the calculating of the third normal vector may include calculating normal vectors of tangent lines respectively corresponding to nearby points adjacent to the third point, and calculating the third normal vector based on a statistical value of the normal vectors.

The calculating of the third normal vector based on the statistical value may include applying, to the normal vectors of the nearby points, a weight assigned based on a distance from the third point to each of the nearby points, and calculating the third normal vector based on a statistical value of normal vectors to which the weight is applied.

The providing of the guide may include moving the virtual pattern piece such that a tangent line of a point corresponding to a predetermined length on the outer line of the second pattern piece meets a tangent line of a point corresponding to a predetermined length on the outer line of the virtual pattern piece.

The providing of the guide may include storing, in the virtual pattern piece, at least one combination point of the second pattern piece and the virtual pattern piece that is obtained by moving the virtual pattern piece such that the outer line of the second pattern piece and the outer line of the virtual pattern piece meet each other, and providing the guide for the combining based on the at least one combination point stored in the virtual pattern piece.

The storing of the at least one combination point in the virtual pattern piece may include obtaining at least one combination point input from a user while moving the virtual pattern piece such that the outer line of the second pattern piece and the outer line of the virtual pattern piece meet each other, and parameterizing information corresponding to the obtained at least one combination point and storing the parameterized information in the virtual pattern piece.

The providing of the guide based on the at least one combination point stored in the virtual pattern piece may include setting a sewing line between the first pattern piece and the second pattern piece based on the at least one combination point stored in the virtual pattern piece, and indicating the sewing line in the first pattern piece and the second pattern piece.

The providing of the guide based on the at least one combination point stored in the virtual pattern piece may include receiving a selection made by the user from among the first pattern piece, the second pattern piece, and the virtual pattern piece for a pattern piece to which the guide is to be provided, and indicating, in the pattern piece selected by the user, a notch mark corresponding to the at least one combination point.

Each of the first pattern piece and the second pattern piece may be modeled with a polygon mesh including a plurality of polygons.

The method may further include forming three-dimensional (3D) clothing by sewing the first pattern piece and the second pattern piece according to the guide, and simulating at least one of the 3D clothing or a 3D avatar over which the 3D clothing is draped.

According to another aspect, there is provided an apparatus for providing a guide for combining pattern pieces, the apparatus including a user interface (UI) configured to receive a selection of a first point in a first pattern piece and a selection of a second point in a second pattern piece to be combined with the first pattern piece, and a processor configured to generate a virtual pattern piece corresponding to the first pattern piece in response to the selection of the second point being received, arrange the virtual pattern piece such that a third point in the virtual pattern piece is matched to the second point in the second pattern piece, and provide a guide for combining the first pattern piece and the second pattern piece by moving the virtual pattern piece such that an outer line of the second pattern piece and an outer line of the virtual pattern piece correspond to each other. The third point may be at a position corresponding to the first point in the first pattern piece.

The processor may calculate a second normal vector of a tangent line corresponding to the second point, calculate a third normal vector of a tangent line corresponding to the third point, and arrange the virtual pattern piece such that the second point and the third point correspond to each other and the second normal vector and the third normal vector are a straight line.

In response to the third point corresponding to a curve or a corner point, the processor may calculate normal vectors of tangent lines respectively corresponding to nearby points adjacent to the third point, and calculate the third normal vector based on a statistical value of the normal vectors.

The processor may store, in the virtual pattern piece, at least one combination point of the second pattern piece and the virtual pattern piece that is obtained by moving the virtual pattern piece such that the outer line of the second pattern piece and the outer line of the virtual pattern piece meet each other, and provide the guide for the combining based on the at least one combination point stored in the virtual pattern piece.

The processor may obtain at least one combination point input from a user while moving the virtual pattern piece such that the outer line of the second pattern piece and the outer line of the virtual pattern piece meet each other, and parameterize information corresponding to the obtained at least one combination point and store the parameterized information in the virtual pattern piece.

The processor may set a sewing line between the first pattern piece and the second pattern piece based on the stored at least one combination point, and indicate the sewing line in the first pattern piece and the second pattern piece.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
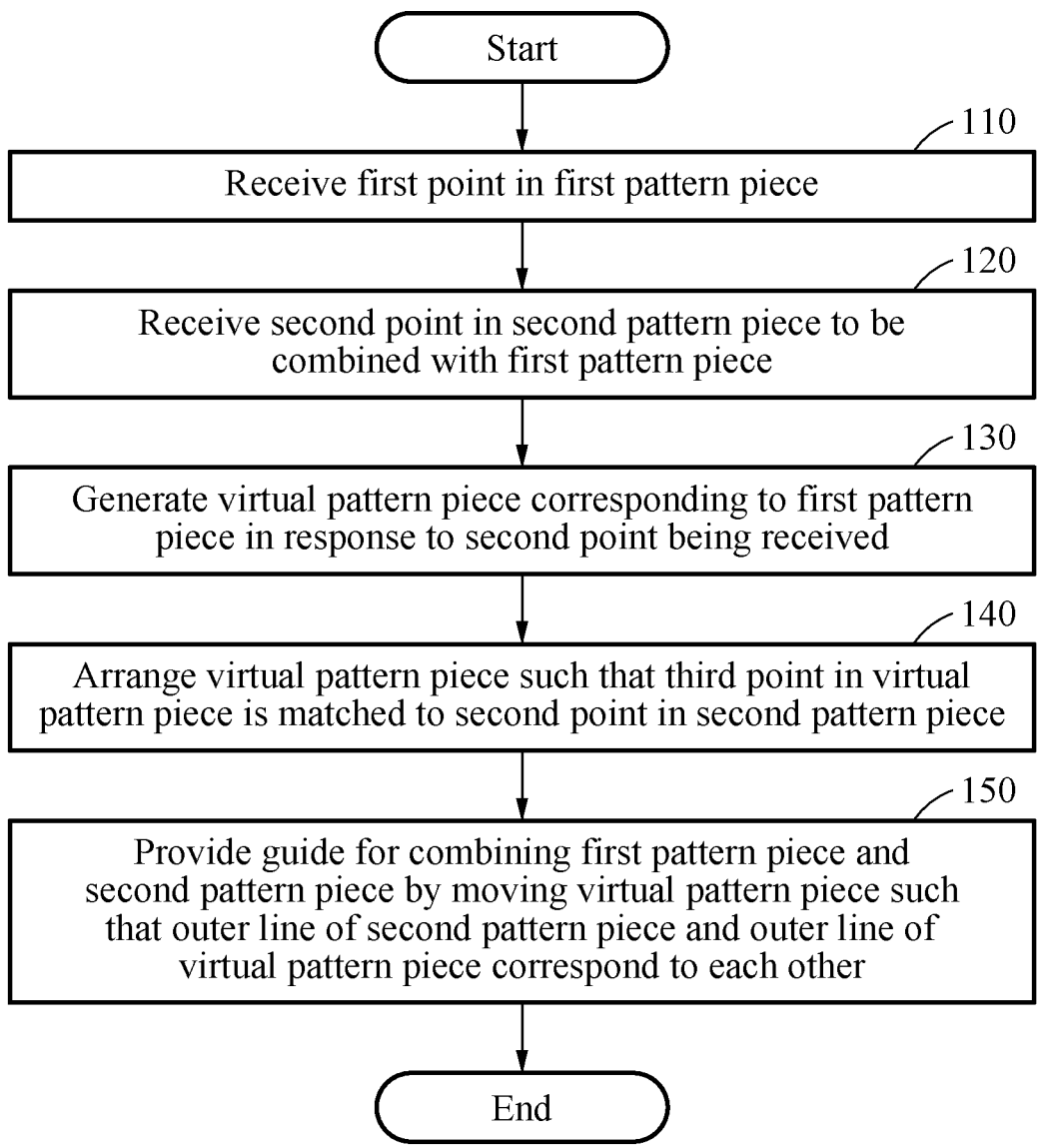
FIG. 1 is a flowchart illustrating an example of a method of providing a guide for combining pattern pieces according to an example embodiment.

Hereinafter, embodiments are described in detail with reference to the accompanying drawings. With respect to the descriptions of the drawings, like reference numerals refer to like elements. Various modifications are possible in various embodiments described below. Embodiments described below are not intended to be limited to the implementation forms, and it is understood that it should include all modifications, equivalents, and/or alternatives according to various embodiments.

The terminology used herein is for the purpose of describing particular examples only and is not intended to limit the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the inventive concept.

Furthermore, in describing example embodiments with reference to the accompanying drawings, the same reference denotations are assigned to the same elements without regard to the drawing denotations, a duplicated description thereof will be omitted. When it is determined that a detailed description of the related well-known technology unnecessarily blurs the gist of embodiments in describing embodiments, a detailed description thereof will be omitted.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The same name may be used to describe an element included in the examples described above and an element having a common function. Unless otherwise mentioned, the descriptions of the examples may be applicable to the following examples, and thus duplicated and redundant descriptions will be omitted for conciseness.

FIG. 1 is a flowchart illustrating an example of a method of providing a guide for combining pattern pieces according to an example embodiment. Referring to FIG. 1, in operation 110, an apparatus for providing a guide for combining pattern pieces (hereinafter simply referred to as a "providing apparatus") receives a selection of a first point in a first pattern piece. The selection of the first point in the first pattern piece may be performed by touch or mouse click on the first point in the first pattern piece and/or a line including the first point. The first point selected in operation 110 may be displayed on a screen as a first point 212 in a first pattern piece 210 illustrated in FIG. 2, for example.

A pattern piece(s) described herein may be a portion of a two-dimensional (2D) pattern used to produce clothing a user desires to drape around or over a three-dimensional (3D) avatar. The pattern piece(s) may correspond to body parts of the 3D avatar, for example, arms (e.g., sleeves), torso (front and back), neck, and legs. The clothing may be 3D virtual clothing corresponding to the 2D pattern. The 2D pattern may be a pattern on a 2D plane that is virtually produced by a computer program. The 2D pattern may include the pattern piece(s) corresponding to the body parts of the 3D avatar, for example, arms, torso, neck, and legs.

The 2D pattern may be modeled with a mesh including a plurality of polygons, for example, triangles, to simulate the 3D virtual clothing. For example, three vertices of a triangle may be point masses having mass, and sides of the triangle may be represented as springs having elasticity which connects the point masses. Thus, the 2D pattern may be modeled by a mass-spring model, for example. The springs may have respective resistance values against, for example, stretch, shear, and bending, depending on a material property of fabric used. Each vertex may move according to the action of an external force such as gravity, and the action of an internal force such as stretch, shear, and bending. When a force being applied to each vertex is obtained by calculating the external force and the internal force, a speed of displacement and motion of each vertex may be obtained. In addition, a motion of the virtual clothing may be simulated through a motion of vertices of a polygon in each time step. By draping, over a 3D avatar, a 2D virtual clothing pattern formed with a mesh, it is possible to embody 3D virtual clothing that looks natural based on the laws of physics.

In operation 120, the providing apparatus receives a selection of a second point in a second pattern piece to be combined with the first pattern piece received in operation 110. The selection of the second point in the second pattern piece may be performed by touch or mouse click on the second point in the second pattern piece and/or a line including the second point. The second point selected in operation 120 may be displayed on a screen as a second point 232 in a second pattern piece 230 illustrated in FIG. 2, for example.

The first point and the second point may be, for example, a start point for sewing from which sewing is to be started in both the pattern pieces, or a start point for length measurement from which length measurement is performed on both the pattern pieces. For example, the first pattern piece may be a main pattern piece such as a front or back side, and the second pattern piece may be a sub-pattern piece such a sleeve. In contrast to this example, the first pattern piece may be a sub-pattern piece, and the second pattern piece may be a main pattern piece. Each of the first pattern piece and the second pattern piece may be modeled with a polygon mesh including a plurality of polygons, for example.

In operation 130, the providing apparatus generates a virtual pattern piece corresponding to the first pattern piece in response to the selection of the second point being received in operation 120. For example, the providing apparatus may display, in advance, as a preview on a screen, a shape obtained by representing an outer shape of the first pattern piece. In this example, the shape obtained by representing the outer shape of the first pattern piece may be referred to herein as a virtual pattern piece. The virtual pattern piece reflects therein only an outer pattern shape corresponding to the first pattern piece and does not reflect therein a texture including a mesh of the first pattern piece. For example, a position of an A point in the first pattern piece may correspond to a position of an A point in the virtual pattern piece. The virtual pattern piece generated in operation 130 may also be referred to as a ghost.

The second pattern piece may be stationary without moving. The virtual pattern piece may be displayed on a screen in a form that moves along an outer line of the second pattern piece. Thus, the second pattern piece may also be referred to as a stationary pattern, and the virtual pattern piece may also be referred to as a moving pattern.

Since the virtual pattern piece does not reflect therein the texture of the first pattern piece, it is possible to reduce computational complexity by moving the virtual pattern piece, instead of moving directly the first pattern piece. By moving the virtual pattern piece obtained by representing the outer shape of the first pattern piece along the outer line of the second pattern piece, the providing apparatus may compare lengths of the pattern pieces with the reduced computational complexity and/or at a higher processing speed, as compared to using the first pattern piece, or provide a guide for sewing the pattern pieces.

In operation 140, the providing apparatus arranges the virtual pattern piece such that a third point in the virtual pattern piece is matched to the second pattern piece in the second pattern piece. The third point may have a position corresponding to the first point in the first pattern piece.

For example, in operation 140, the providing apparatus may calculate a second normal vector of a tangent line corresponding to the second point. In addition, the providing apparatus may calculate a third normal vector of a tangent line corresponding to the third point. The providing apparatus may arrange the virtual pattern piece such that the second point and the third point correspond to each other and the second normal vector and the third normal vector are to become a straight line. Hereinafter, how the providing apparatus arranges a virtual pattern piece will be described in detail with reference to FIGS. 3. and 4.

For example, in a case in which points are selected from different pattern pieces in operations 110 and 120, the providing apparatus may move a virtual pattern piece generated corresponding to a pattern piece (e.g., the first pattern piece) initially selected in operation 110 to a second point in a pattern piece (e.g., the second pattern piece) selected in operation 120, and display them.

In operation 150, the providing apparatus provides a guide for combining the first pattern piece and the second pattern piece by moving the virtual pattern piece such that the outer line of the second pattern piece and the outer line of the virtual pattern piece correspond to each other. Although it is described that the second pattern piece is stationary and the virtual pattern piece moves, the providing apparatus may also move the second pattern piece or move both the second pattern piece and the virtual pattern piece. The guide for combining the first pattern piece and the second pattern piece may be construed as encompassing various guide lines including, for example, a sewing line for sewing the first pattern piece and the second pattern piece together and a notch mark for the sewing.

For example, in operation 150, the providing apparatus may move the virtual pattern piece such that a tangent line of a point corresponding to a predetermined length on the outer line of the second pattern piece (e.g., a predetermined length from the second point) meets a tangent line of a point corresponding to a predetermined length on the outer line of the virtual pattern piece (e.g., a predetermined length from the third point). The providing apparatus may move or rotate the virtual pattern piece such that the outer line of the second pattern piece and the outer line of the virtual pattern piece meet each other. In this example, a length of an outer line of each pattern piece that is identified as the virtual pattern piece moves may be displayed on a screen.

For example, in operation 150, the providing apparatus may store, in the virtual pattern piece, at least one combination point of the second pattern piece and the virtual pattern piece that is obtained by moving the virtual pattern piece such that the outer line of the second pattern piece and the outer line of the virtual pattern piece meet each other. For example, the providing apparatus may obtain at least one combination point input from the user while moving the virtual pattern piece such that the outer line of the second pattern piece and the outer line of the virtual pattern piece meet each other. Hereinafter, how the providing apparatus obtains at least one combination point will be described in detail with reference to FIG. 5.

The providing apparatus may parameterize information corresponding to the obtained at least one combination point and store the parameterized information in the virtual pattern piece. For example, the providing apparatus may store the information associated with the combination point (e.g., a coordinate corresponding to the combination point) as parameters that depend on the virtual pattern piece.

The providing apparatus may provide the guide for the combining based on the at least one combination point stored in the virtual pattern piece. For example, the providing apparatus may set a sewing line between the first pattern piece and the second pattern piece based on the at least one combination point stored in the virtual pattern piece. The providing apparatus may indicate the sewing line in the first pattern piece and the second pattern piece. Alternatively, the providing apparatus may receive a selection made by the user from among the first pattern piece, the second pattern piece, and the virtual pattern piece for a pattern piece to which the guide is to be provided. The providing apparatus may indicate a notch (or a notch mark) corresponding to the at least one combination point in the pattern piece selected by the user. The notch mark may indicate design intension, for example, a sign indicating how to match measurements in a clothing pattern by sewing. The notch mark may be indicated to maintain a silhouette or design of the clothing as it is or facilitate sewing. For example, a single notch may be indicated in a pattern piece corresponding to a front side among two pattern pieces to be sewed together, and a double notch may be indicated in a pattern piece corresponding to a back side of the two pattern pieces. Thus, it is possible to readily identify the front side and the back side. The providing apparatus may sew the pattern pieces by accurately matching the pattern pieces respectively corresponding to the front side and the back side according to the indicated notches.

According to an example embodiment, the providing apparatus may form 3D clothing by sewing the first pattern piece and the second pattern piece based on the guide provided in operation 150. The providing apparatus may simulate at least one of virtual clothing formed by sewing pattern pieces or a 3D avatar over which the virtual clothing is draped. The term "drape" or "draping" described herein may be construed as a process of putting, on a 3D avatar, 3D clothing formed by combining or sewing 2D pattern pieces of clothing by a computer program.

Figure 2:
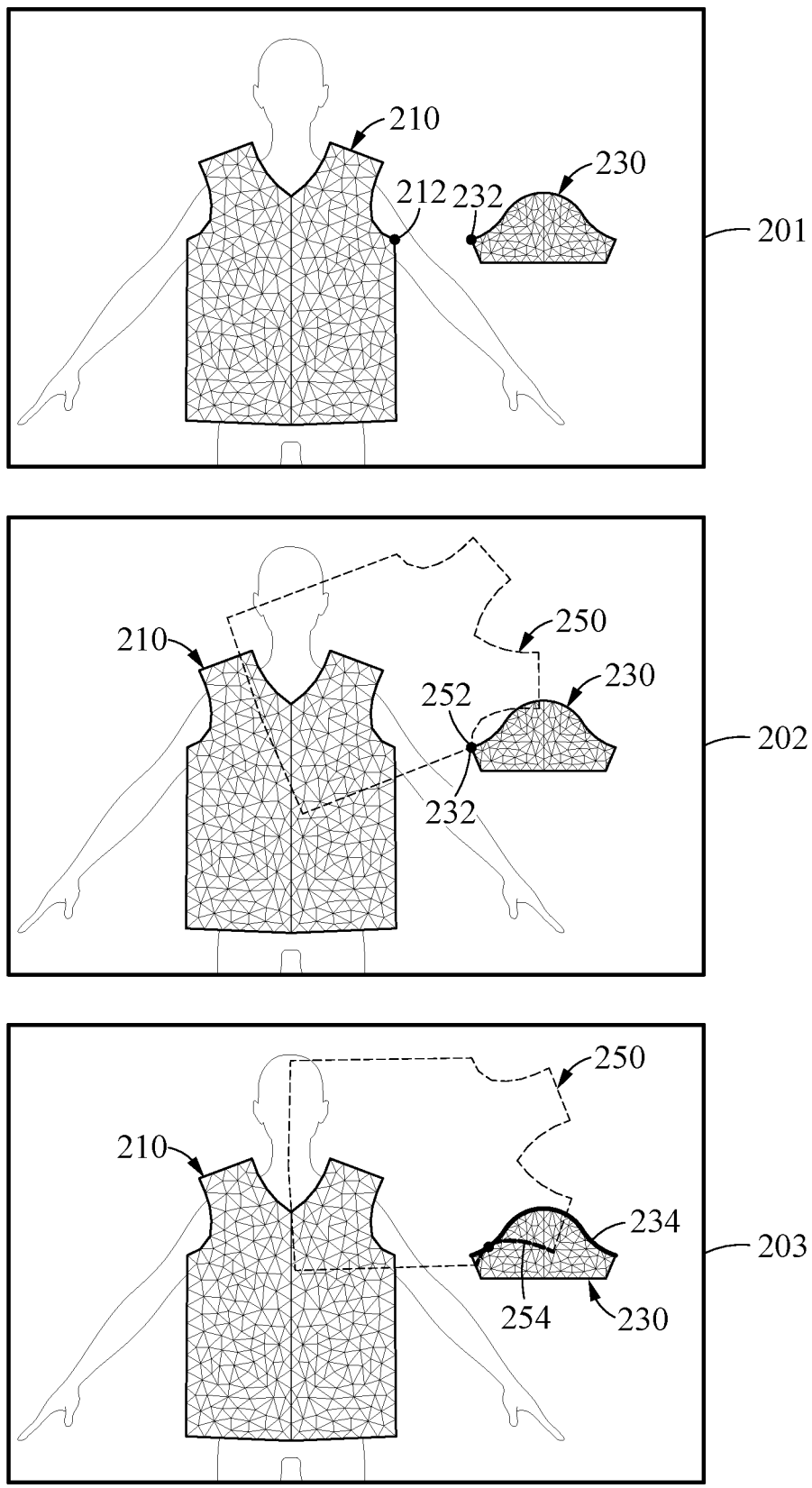
FIG. 2 illustrates an example of arranging and moving a virtual pattern piece by an apparatus for providing a guide for combining pattern pieces (hereinafter simply a providing apparatus) according to an example embodiment.

FIG. 2 illustrates an example of arranging and moving a virtual pattern piece by a providing apparatus according to an example embodiment. Hereinafter, how pattern pieces, for example, a first pattern piece 210, a second pattern piece 230, and a virtual pattern piece 250, are arranged and moved will be described with reference to screens 201, 202, and 203 of FIG. 2.

According to an example embodiment, by moving a pattern piece such that outer lines of two pattern pieces meet each other, it is possible to compare respective lengths of the two pattern pieces. Through such a length comparing process, a providing apparatus may indicate, in each of the two pattern pieces, a notch(es) or sewing line that is a reference for sewing the two pattern pieces.

The providing apparatus may activate a pattern walking function included in a menu displayed at an upper end of a screen of an application that provides a guide for combining pattern pieces, and select one point from each of two pattern pieces displayed on the screen. The point selected from each pattern piece may correspond to a start point for sewing, for example.

For example, when a cursor is moved along an outer line of a pattern piece A, the providing apparatus may display an animated outer shape of another pattern piece B such that a corresponding outer line of the pattern piece B is moved along the outer line of the pattern piece A by being engaged therewith.

For example, as illustrated, the providing apparatus may receive a first point 212 in the first pattern piece 210 selected by a user as shown on the screen 201. In addition, the providing apparatus may receive a second point 232 in the second pattern piece 230 selected by the user as shown on the screen 201.

When the second point 232 is received as an input, the providing apparatus may then generate the virtual pattern piece 250 corresponding to the first pattern piece 210. As shown on the screen 202, the providing apparatus may arrange the virtual pattern piece 250 such that a third point 252 in the virtual pattern piece 250 corresponding to a position of the first point 212 in the first pattern piece 210 (e.g., a position at a lower end of a left sleeve) is matched to the second point 232 in the second pattern piece 230. Hereinafter, how the providing apparatus arranges the virtual pattern piece 250 will be described in detail with reference to FIG. 3.

As shown on the screen 203, the providing apparatus may move the virtual pattern piece 250 such that an outer line 234 of the second pattern piece 230 and an outer line 254 of the virtual pattern piece 250 correspond to each other. Here, an outer line of a pattern piece may be defined in a clockwise or counterclockwise direction. A movement of the virtual pattern piece 250 may be determined based on a movement from a start point on the outer line 234 of the second pattern piece 230. The providing apparatus may determine a combination position of pattern pieces at which the pattern pieces are combined by comparing lengths of portions to be combined through a movement of the pattern pieces.

Although described in detail hereinafter, the providing apparatus may obtain at least one combination point input from the user while moving the virtual pattern piece 250 such that the outer line 234 of the second pattern piece 230 and the outer line 254 of the virtual pattern piece 250 meet each other. During such a movement of the virtual pattern piece 250, the user may add the at least one combination point, for example, a notch, to the second pattern piece 230 and/or the virtual pattern piece 250, through a right mouse click, for example. The providing apparatus may store, in the virtual pattern piece 250, information associated with the at least one combination point.

The providing apparatus may provide a guide for combining the first pattern piece 210 and the second pattern piece 230 using the virtual pattern piece 250 in which the at least one combination point is stored.

Figure 3A:
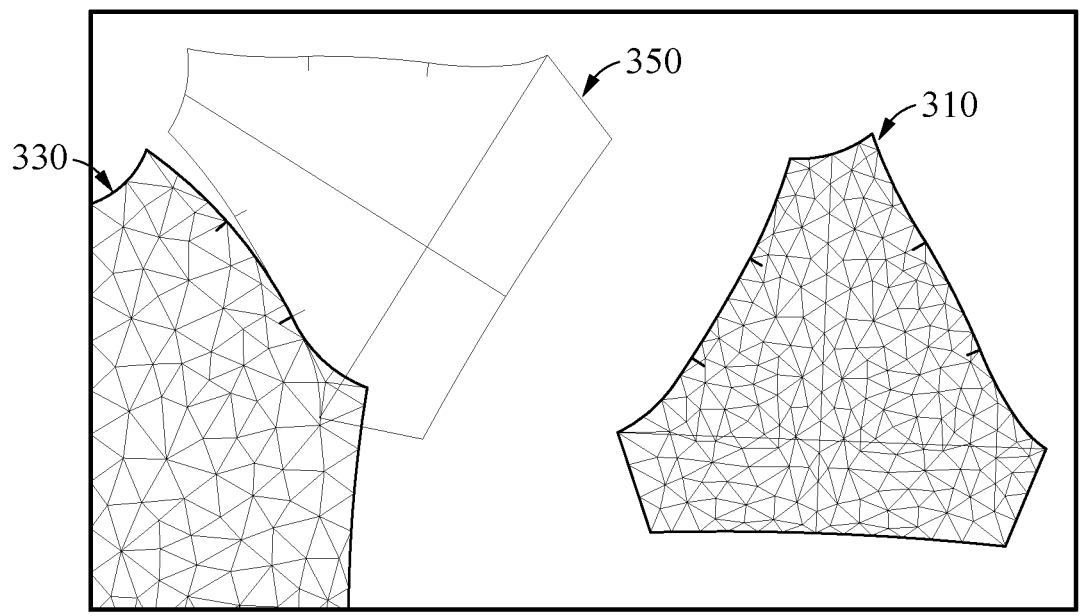
FIGS. 3A and 3B illustrate an example of arranging and moving a virtual pattern piece by a providing apparatus according to an example embodiment.
Figure 3B:
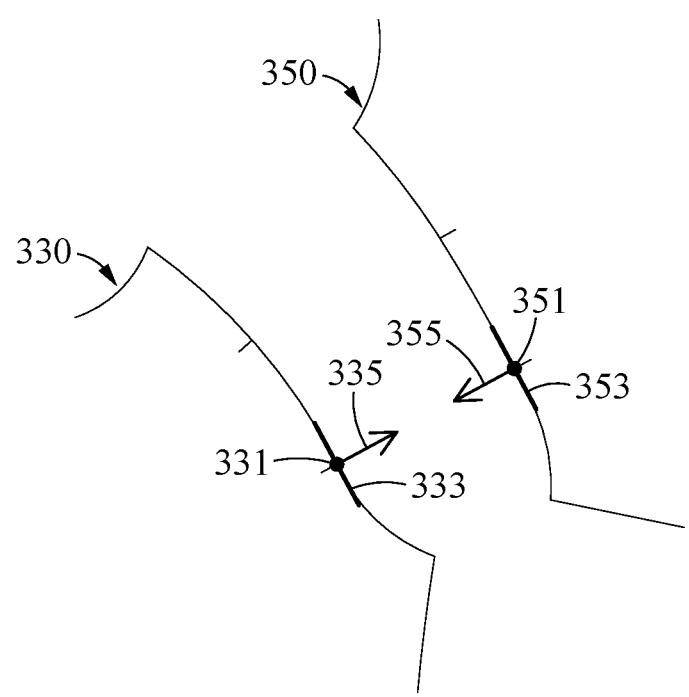

FIGS. 3A and 3B illustrate an example of arranging and moving a virtual pattern piece by a providing apparatus according to an example embodiment. FIG. 3A illustrates a first pattern piece 310, a second pattern piece 330, and a virtual pattern piece 350. FIG. 3B illustrates how the virtual pattern piece 350 is arranged by a combination between one point (e.g., a second point 331) in the second pattern piece 330 and one point (e.g., a third point 351) in the virtual pattern piece 350.

According to an example embodiment, a providing apparatus may apply a first point selected by a user from a first pattern piece 310 to the third point 351 in the virtual pattern piece 350. Here, the expression "applying a first point to a third point" may be construed as indicating the third point at a position in the virtual pattern piece 350 that corresponds to the first point in the first pattern piece 310.

The providing apparatus may arrange the virtual pattern piece 350 such that the third point 351 in the virtual pattern piece 350 is matched to the second point 331 in the second pattern piece 330.

For example, the providing apparatus may calculate a second normal vector 335 of a tangent line 333 corresponding to the second point 331, and calculate a third normal vector 355 of a tangent line 353 corresponding to the third point 351. The providing apparatus may arrange the virtual pattern piece 350 such that the second point 331 and the third point 351 correspond to each other and the second normal vector 335 and the third normal vector 355 become a straight line.

A method of arranging a virtual pattern piece described above with reference to FIGS. 3A and 3B may be applied to move a virtual pattern piece such that an outer line of the second pattern piece 330 and an outer line of the virtual pattern piece 350 correspond to each other.

The providing apparatus may calculate normal vectors of tangent lines respectively corresponding to points in a second pattern piece and points in a virtual pattern piece that meet each other as the virtual pattern piece is moved, and move the virtual pattern piece such that points of both the pattern pieces correspond to each other and the normal vectors of the tangent lines corresponding to both the patter pieces are a straight line.

According to an example embodiment, a pattern piece may include a curved portion including a curve and/or a corner portion including a corner point, in addition to a straight line portion. A normal vector of a point corresponding to the straight line portion may be obtained by calculating a normal vector of a tangent line of the point. A curve may be represented as a set of segments of a straight line. Thus, the providing apparatus may obtain a normal vector of a curve or a corner point using a statistical value of normal vectors of nearby segments of a straight line. Hereinafter, how the providing apparatus obtains a normal vector of a curved portion and/or a corner portion of a pattern piece will be described in detail with reference to FIGS. 4A and 4B.

Figure 4A:
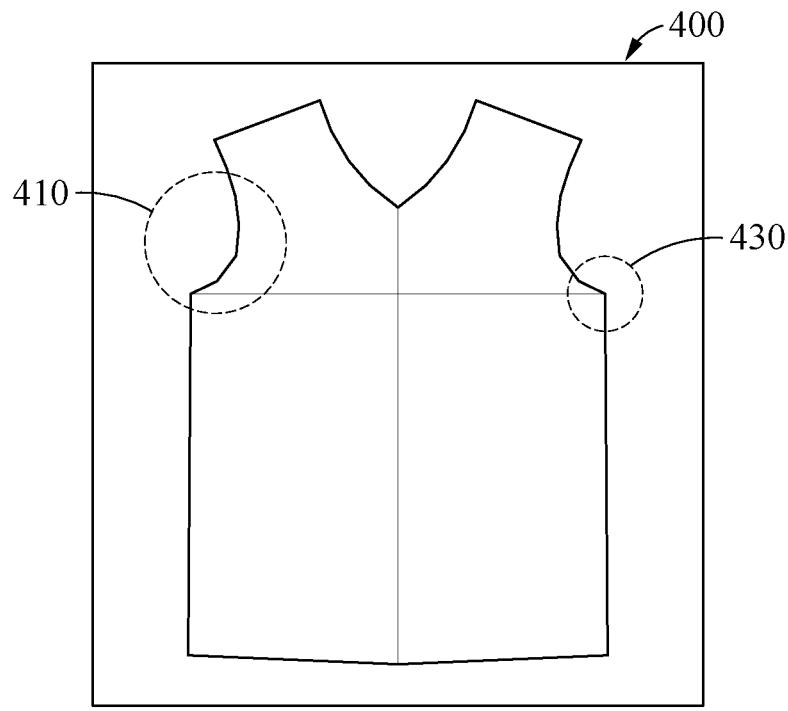
FIGS. 4A and 4B illustrate an example of calculating a normal vector corresponding to a curved portion and a corner portion by a providing apparatus according to an example embodiment.
Figure 4B:
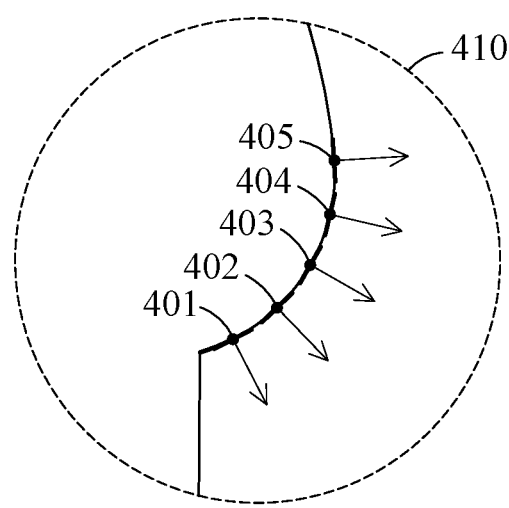

FIG. 4 illustrates an example of calculating a normal vector corresponding to a curved portion and a corner portion by a providing apparatus according to an example embodiment. FIG. 4A illustrates a pattern piece 400 including a curved portion 410 and a corner portion 430 that are not a straight line portion. FIG. 4B illustrates a target point 403 in the curved portion 410 and nearby points 401, 402, 404, and 405 adjacent to the target point 403. The target point 403 may be a point from which a normal vector is to be calculated.

As described above, a curve may be represented as a set of segments of a straight line. For example, in a case in which a point from which a normal vector is to be calculated is in the curved portion 410, a providing apparatus may obtain a normal vector of the target point 403 corresponding to a curved using a statistical value of normal vectors of the nearby points 401, 402, 404, and 405 adjacent to the target point 403.

In this example, when obtaining the normal vector of the target point 403, the providing apparatus may apply, to the normal vectors calculated corresponding to the nearby points 401, 402, 404, and 405, a weight assigned based on a distance from the target point 403 to each of the nearby points 401, 402, 404, and 405. In this example, the points 402 and 404 are closer to the target point 403 as compared to the points 401 and 405, and thus the weight having a greater value than that of the weight applied to the points 401 and 405 may be assigned to the points 402 and 404. The providing apparatus may calculate the normal vector of the target point 403 based on a statistical value (e.g., a weighted mean) of normal vectors to which the weight is applied.

A method of calculating a normal vector described above with reference to FIGS. 4A and 4B may be applied to calculate a normal vector for curved portions and corner portions of a second pattern piece and a virtual pattern piece during a movement of the virtual pattern piece.

Figure 5:
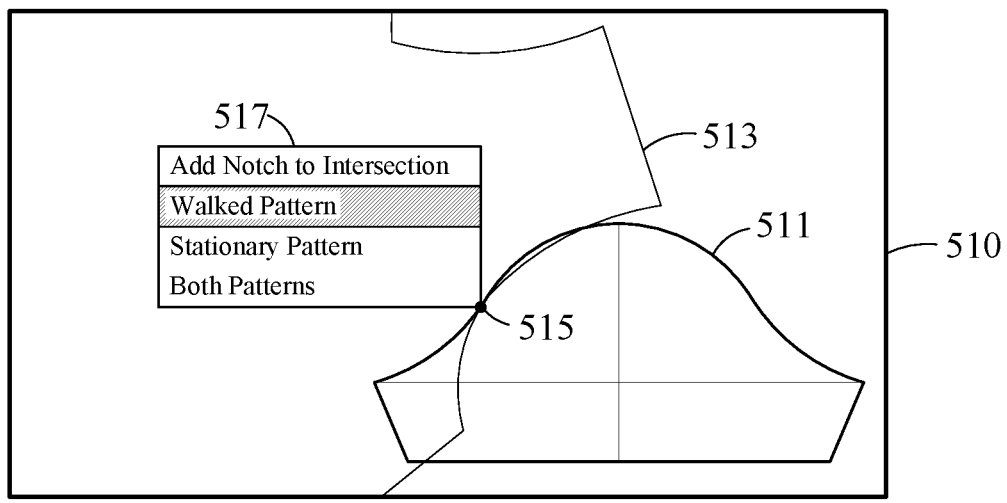
FIG. 5 illustrates an example of providing a guide based on at least one combination point obtained from a user while a providing apparatus is moving a virtual pattern piece according to an example embodiment.
Figure 5:
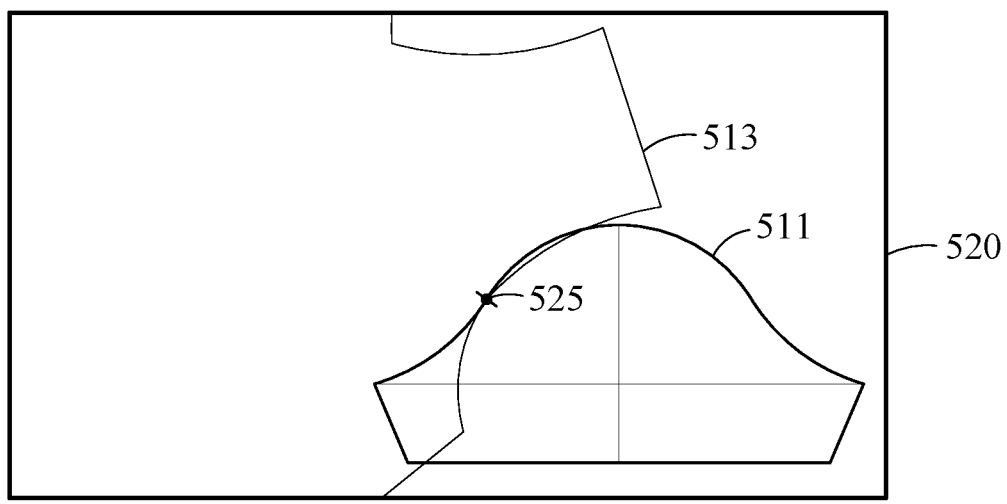
Figure 5:
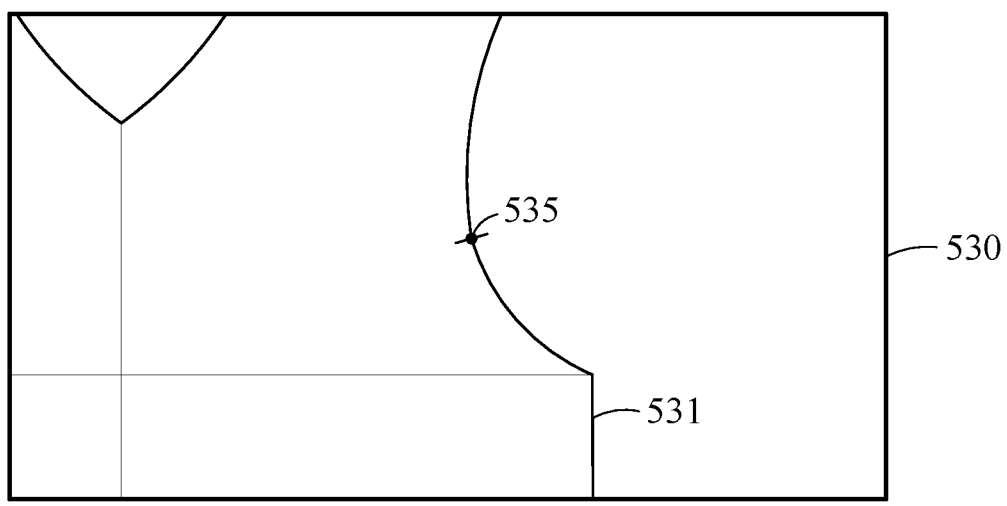

FIG. 5 illustrates an example of providing a guide based on at least one combination point obtained from a user while a providing apparatus is moving a virtual pattern piece according to an example embodiment. Hereinafter, how at least one combination point is obtained through a user interface (UI) and the obtained combination point is applied to each pattern piece will be described in detail with reference to screens 510, 520, and 530 of FIG. 5.

For example, as shown on the screen 510, a providing apparatus may receive, as an input, a combination point 515 from a user through a UI 517 while moving a virtual pattern piece 513 such that an outer line of a second pattern piece 511 and an outer line of the virtual pattern piece 513 meet each other. For example, when the user right clicks a mouse during a movement of the virtual pattern piece 513, the UI

517 may be displayed as shown on the screen 510. In this example, when the user selects "Add Notch to Intersection" displayed on the UI 517, the combination point 515 may be selected.

The providing apparatus may store information associated with the combination point 515 in the virtual pattern piece 513. The combination point 515 may correspond to a point at which the outer line of the virtual pattern piece 513 and the outer line of the second pattern piece 511 meet each other. Thus, the information associated with the combination point 515 may include position information including a position and a coordinate of the combination point 515 in the second pattern piece 511, in addition to position information including a position and a coordinate of the combination point 515 in the virtual pattern piece 513.

The providing apparatus may parameterize the information associated with the combination point 515 and store the parameterized information in the virtual pattern piece 513.

The providing apparatus may indicate a notch mark 525 on the outer line of the second pattern piece 511 using the information stored in the virtual pattern piece 513, as shown on the screen 520. The notch mark 525 may be the same point as the combination point 515 displayed on the screen 510.

In addition, the providing apparatus may indicate a notch mark 535 in a first pattern piece 531 corresponding to the virtual pattern piece 513 using the information stored in the virtual pattern piece 513, as shown on the screen 530. The notch mark 535 may be a point in the first pattern piece 531 corresponding to a position corresponding to the combination point 515 on the outer line of the virtual pattern piece 513 displayed on the screen 510.

Figure 6:
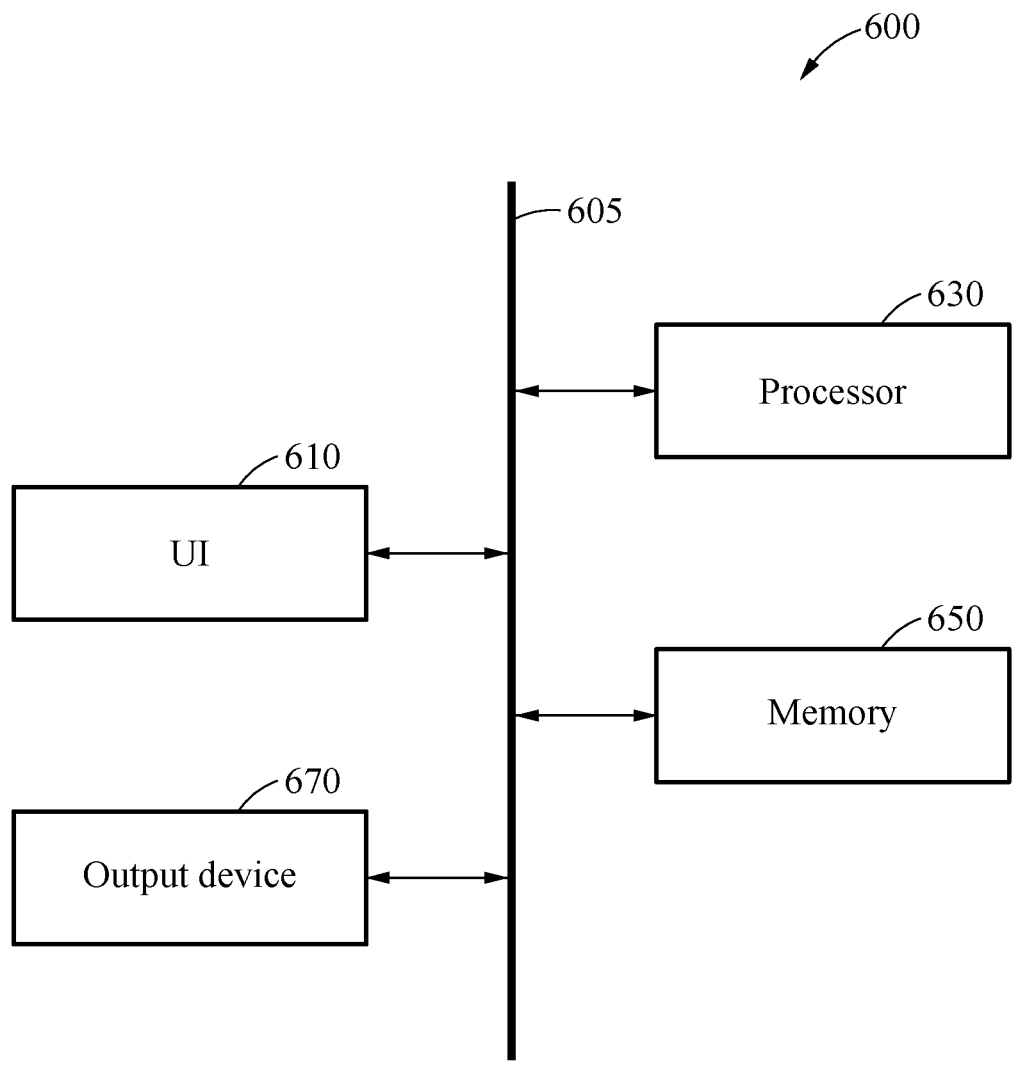
FIG. 6 is a block diagram illustrating an example of a providing apparatus according to an example embodiment.

FIG. 6 is a block diagram illustrating an example of a providing apparatus for providing a guide for combining pattern pieces according to an example embodiment. Referring to FIG. 6, a providing apparatus 600 includes a UI 610 and a processor 630. The providing apparatus 600 further includes a memory 650 and an output device 670. The UI 610, the processor 630, the memory 650, and the output device 670 may communicate with one another through a communication bus 605.

The UI 610 may receive, from a user, a selection of a first point in a first pattern piece. In addition, the UI 610 may receive, from a user, a selection of a second point in a second pattern piece to be combined with the first pattern piece. The UI 610 may receive a touch input and the like through, for example, a stylus pen, a mouse, a keyboard, or a touch interface.

In response to the second point being input through the UI 610, the processor 630 may generate a virtual pattern piece corresponding to the first pattern piece. The processor 630 may arrange the virtual pattern piece such that a third point in the virtual pattern piece is matched to the second point in the second pattern piece. The third point may have a position corresponding to the first point in the first pattern piece.

The processor 630 may calculate a second normal vector of a tangent line corresponding to the second point, and calculate a third normal vector of a tangent line corresponding to the third point. The processor 630 may arrange the virtual pattern piece such that the second point and the third point correspond to each other, and the second normal vector and the third normal vector are a straight line.

For example, when the third point corresponds to a corner point, the processor 630 may calculate normal vectors of tangent lines corresponding to nearby points adjacent to the third point. The processor 630 may calculate the third normal vector based on a statistical value of the normal vectors.

The processor 630 may provide a guide for combining the first pattern piece and the second pattern piece by moving the virtual pattern piece such that an outer line of the second pattern piece corresponds to an outer line of the virtual pattern piece.

The processor 630 may store, in the virtual pattern piece, at least one combination point of the second pattern piece and the virtual pattern piece that is obtained by moving the virtual pattern piece such that the outer line of the second pattern piece and the outer line of the virtual pattern piece meet each other. The processor 630 may obtain the at least one combination point input from the user while moving the virtual pattern piece such that the outer line of the second pattern piece and the outer line of the virtual pattern piece meet each other. The processor 630 may parameterize information corresponding to the obtained at least one combination point and store the parameterized information in the virtual pattern piece.

The processor 630 may provide the guide for the combining based on the at least one combination point stored in the virtual pattern piece. For example, the processor 630 may set a sewing line between the first pattern piece and the second pattern piece based on the at least one combination point stored in the virtual pattern piece. The processor 630 may indicate the sewing line in the first pattern piece and in the second pattern piece.

The memory 650 may store information associated with the first point in the first pattern piece and the second point in the second pattern piece that are received through the UI 610. Here, the information may be, for example, coordinate information of the first point and the second point. In addition, the memory 650 may store the guide for combining the first pattern piece and the second pattern piece that is provided by the processor 630. The guide for combining the first pattern piece and the second pattern piece may include at least one of a notch mark or a sewing line for sewing the first pattern piece and the second pattern piece. The guide for combining the first pattern piece and the second pattern piece may be indicated in at least one of the first pattern piece, the second pattern piece, or the virtual pattern piece, according to settings or selection by the user.

In addition, the memory 650 may store information associated with virtual clothing formed by sewing the pattern pieces according to the guide by the processor 630, data of a 3D avatar over which the virtual clothing is draped, and the like. The data of the 3D avatar may include, for example, a body size of the 3D avatar, a position coordinate of each body part of the 3D avatar, and the like.

The memory 650 may be a volatile or nonvolatile memory.

The output device 670 may display virtual clothing formed by the processor 630 and/or the 3D avatar over which the virtual clothing is draped. The output device 670 may output the virtual clothing and/or the 3D avatar over which the virtual clothing is draped onto a display or screen or a separate clothing pattern producing device.

The output device 670 may be, for example, the display or a communication interface configured to communicate with the outside of the providing apparatus 600.

The processor 630 may perform one or more, or all, of the methods described above with reference to FIGS. 1 through 5 or algorithms corresponding to the methods. The processor 630 may be a data processing device embodied by hardware having a circuit of a physical structure to execute desired operations. The desired operations may include, for example, codes or instructions included in a program. The processor 630 may be embodied as, for example, a central processing unit (CPU), a graphics processing unit (GPU), or a neural network processing unit (NPU). For example, the providing apparatus 600 embodied by hardware may include, for example, a microprocessor, a CPU, a processor core, a multicore processor, a multiprocessor, an application-specific integrated circuit (ASIC), and a field-programmable gate array (FPGA).

The processor 630 may execute a program to control the providing device 600. A program code executed by the processor 630 may be stored in the memory 650.

The memory 650 may store various sets of information generated in a processing operation of the processor 630 described above. In addition, the memory 650 may store various sets of data and programs, and the like. The memory 650 may include a volatile or nonvolatile memory. The memory 650 may include a massive storage medium such as a hard disk to store various sets of data.

According to example embodiments described herein, by moving 2D pattern pieces of clothing and comparing lengths of portions to be combined, it is possible to determine a combination position at which the pattern pieces are to be combined.

According to example embodiments described herein, by providing a simulation using a virtual pattern piece representing an outer shape of a 2D pattern piece of clothing, it is possible to compare lengths of pattern pieces with a relatively lower computational complexity and/or at a higher processing speed, compared to when using pattern pieces including texture, or is it possible to provide a guide for sewing the pattern pieces.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method, comprising:
 receiving selection of a first point in a first two-dimensional (2D) pattern piece;
 receiving selection of a second point in a second 2D pattern piece to be combined with the first 2D pattern piece;
 in response to receiving the selection of the second point, generating a replicated 2D pattern piece of the first 2D pattern piece;
 identifying a third point in the replicated 2D pattern piece corresponding to the first point in the first 2D pattern piece; and displaying the replicated 2D pattern piece rotated, translationally moved or both rotated and translationally moved to have the third point in the replicated 2D pattern piece meet the second point in the second 2D pattern piece.

2. The method of claim 1, further comprising:
receiving a first input indicating movement from the second point to an updated point in the second 2D pattern piece;
identifying a fourth point in the replicated 2D pattern piece corresponding to the updated point in the first 2D pattern piece; and
displaying the replicated 2D pattern piece further rotated, further translationally moved or both further rotated and translationally moved to have the updated point in the first 2D pattern piece meet the fourth point in the second 2D pattern piece.

3. The method of claim 2, further comprising displaying animation of rotating, translationally moving or both rotating and translationally moving the replicated 2D pattern piece as intermediate inputs between the first point to the updated point are received.

4. The method of claim 2, wherein a length of a portion of an outer line of the replicated 2D pattern piece between the third point and the fourth point is identical to a length of a portion of an outer line of the second 2D pattern piece between the second point and the updated point.

5. The method of claim 2, further comprising:
receiving a second input at the updated point, the second input different from the first input; and
responsive to receiving the second input, displaying an option to generate one or both of a first mark at the updated point of the second 2D pattern and a second mark at a fifth point of the first 2D pattern corresponding to the fourth point in the replicated 2D pattern.

6. The method of claim 5, further comprising:
receiving a selection on the displayed option; and
displaying one or both of the first mark and the second mark according to the selection on the displayed option.

7. The method of claim 6, wherein the first mark and the second mark represent notches.

8. The method of claim 2, wherein a first normal vector of an outer line of the second 2D pattern piece at the updated point is parallel to a second normal vector of an outer line of the replicated 2D pattern piece at the fourth point.

9. The method of claim 8, wherein the first normal vector is determined by at least applying first weights to first normal vectors at points on the outer line of the second pattern piece adjacent to the updated point, and the second normal vector is determined by at least applying second weights to second normal vectors at points on the outer line of the replicated 2D pattern piece adjacent to the fourth point.

10. The method of claim 2, further comprising:
storing the updated point and a point of the first 2D pattern piece corresponding to the fourth point of the replicated 2D pattern piece; and
setting a sewing line between the first 2D pattern piece and the second 2D pattern to include the stored update point and the stored point of the first 2D pattern piece.

11. The method of claim 1, wherein the first point is on an outer line of the first 2D pattern, and the second point is on an outer line of the replicated 2D pattern piece.

12. The method of claim 1, wherein the first point and the second point are starting points for sewing the first 2D pattern piece and the second 2D pattern piece.

13. The method of claim 1, further comprising displaying a guide for combining the first pattern piece and the second pattern piece.

14. A non-transitory computer-readable storage medium storing instructions thereon, the instructions, when executed by a processor, cause the processor to:
receive selection of a first point in a first two-dimensional (2D) pattern piece;
receive selection of a second point in a second 2D pattern piece to be combined with the first 2D pattern piece;
in response to receiving the selection of the second point, generate a replicated 2D pattern piece of the first 2D pattern piece;
identify a third point in the replicated 2D pattern piece corresponding to the first point in the first 2D pattern piece; and
display the replicated 2D pattern piece rotated, translationally moved or both rotated and translationally moved to have the third point in the replicated 2D pattern piece meet the second point in the second 2D pattern piece.

15. The non-transitory computer-readable storage medium of claim 14, further storing instructions that cause the processor to:
receive a first input indicating movement from the second point to an updated point in the second 2D pattern piece;
identify a fourth point in the replicated 2D pattern piece corresponding to the updated point in the first 2D pattern piece; and
display the replicated 2D pattern piece further rotated, further translationally moved or both further rotated and translationally moved to have the updated point in the first 2D pattern piece meet the fourth point in the second 2D pattern piece.

16. The non-transitory computer-readable storage medium of claim 15, further storing instructions that cause the processor to display animation of rotating, translationally moving or both rotating and translationally moving the replicated 2D pattern piece as intermediate inputs between the first point to the updated point are received.

17. The non-transitory computer-readable storage medium of claim 15, wherein a length of a portion of an outer line of the replicated 2D pattern piece between the third point and the fourth point is identical to a length of a portion of an outer line of the second 2D pattern piece between the second point and the updated point.

18. The non-transitory computer-readable storage medium of claim 15, further storing instructions that cause the processor to:
receive a second input at the updated point, the second input different from the first input; and
responsive to receiving the second input, display an option to generate one or both of a first mark at the updated point of the second 2D pattern and a second mark at a fifth point of the first 2D pattern corresponding to the fourth point in the replicated 2D pattern.

19. The non-transitory computer-readable storage medium of claim 15, wherein a first normal vector of an outer line of the second 2D pattern piece at the updated point is parallel to a second normal vector of an outer line of the replicated 2D pattern piece at the fourth point.

20. A method, comprising:
receiving selection of a first point in a first two-dimensional (2D) pattern piece;

receiving selection of a second point in a second 2D pattern piece to be combined with the first 2D pattern piece;

in response to receiving the selection of the second point, generating a replicated 2D pattern piece of the first 2D pattern piece;

identifying a third point in the replicated 2D pattern piece corresponding to the first point in the first 2D pattern piece; and displaying the replicated 2D pattern piece located to have the third point in the replicated 2D pattern piece meet the second point in the second 2D pattern piece and rotated to have a normal vector at the third point that is parallel to a normal vector of the second 2D pattern piece at the second point.

* * * * *